US010933681B2

(12) United States Patent
Chakar et al.

(10) Patent No.: US 10,933,681 B2
(45) Date of Patent: Mar. 2, 2021

(54) SECURE SUBSTRATE (71) Applicant: Appvion Operations, Inc., Appleton, WI (US)

(72) Inventors: Fadi S. Chakar, Neenah, WI (US); Mark R. Fisher, Appleton, WI (US); Ian Draheim, Appleton, WI (US)

(73) Assignee: Appvion Operations, Inc., Appleton, WI (US)

( * ) Notice: Subject to any disclaimer, the term of this patent is extended or adjusted under 35 U.S.C. 154(b) by 0 days.

(21) Appl. No.: 16/577,254

(22) Filed: Sep. 20, 2019

(65) Prior Publication Data

US 2020/0094607 A1 Mar. 26, 2020

Related U.S. Application Data (60) Provisional application No. 62/734,602, filed on Sep. 21, 2018.

(51) Int. Cl.
*B42D 25/21* (2014.01)
*B32B 7/12* (2006.01)
*B32B 29/00* (2006.01)
*B42D 25/30* (2014.01)
*B42D 25/27* (2014.01)

(52) U.S. Cl.
CPC ............... *B42D 25/21* (2014.10); *B32B 7/12* (2013.01); *B32B 29/002* (2013.01)

(58) Field of Classification Search
CPC ............ B42D 25/21; B32B 29/00; B32B 7/12
USPC ... 283/67, 70, 72, 74, 94, 98, 107, 109, 110, 283/901
See application file for complete search history.

(56) References Cited

U.S. PATENT DOCUMENTS

| 5,601,887 | A | 2/1997 | Rich et al. | |
|---|---|---|---|---|
| 2004/0076803 | A1 | 4/2004 | Jaynes | |
| 2007/0164559 | A1* | 7/2007 | Kozdras | A63F 3/0655 283/100 |
| 2012/0025516 | A1 | 2/2012 | Miller et al. | |
| 2012/0067746 | A1* | 3/2012 | Gremaud | A45C 11/00 206/81 |
| 2012/0267888 | A1* | 10/2012 | Behm | B42D 25/378 283/100 |
| 2013/0214524 | A1* | 8/2013 | Hagemann | B42D 25/23 283/72 |

(Continued)

FOREIGN PATENT DOCUMENTS

WO WO 2009/062297 5/2019

OTHER PUBLICATIONS

International Search Report and Written Opinion for PCT International Application No. PCT/ US2019/052146, dated Dec. 5, 2019, 11 pages.

*Primary Examiner* — Justin V Lewis
(74) *Attorney, Agent, or Firm* — Stephen C. Jensen (57) ABSTRACT

A secure substrate may include a base layer and an opacity layer disposed above the base layer. An optional background layer may be disposed above the opacity layer. The secure substrate may further include an inkjet receptive layer. A first inkjet receptive layer may be disposed above the background layer, and a second inkjet layer may be disposed below the base layer. The opacity layer may include copper such as metallic copper flakes or other particles. The opacity layer may also include a binder material such as polyvinyl alcohol, and in some cases also carbon black, process black, or the like.

11 Claims, 4 Drawing Sheets

(56) References Cited

U.S. PATENT DOCUMENTS

2018/0021668 A1  1/2018  Finnerty et al.

* cited by examiner

SECURE SUBSTRATE

CROSS REFERENCE TO RELATED APPLICATIONS

This application claims priority under 35 U.S.C. § 119 (e) to provisional patent application U.S. Ser. No. 62/734,602, "Secure Substrate", filed Sep. 21, 2018, the contents of which are incorporated herein by reference.

BACKGROUND

Scratch-off coatings can be used to hide indicia printed onto a substrate, allowing the indicia to be revealed only when the coating is removed. Often, scratch-off coatings are removed with a coin. However, during removal of the scratch-off coating, the integrity of the underlying substrate may be compromised.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION

Scratch-off coatings are used on scratch-off products, such as lottery tickets, gift cards, contest entries, and the like, to hide information. The information, typically in the form of printed indicia, that is hidden is revealed to the buyer of the scratch-off product (e.g. lottery ticket) when the scratch-off coating is removed by, for example, being scraped with a coin. The indicia may be a barcode, win/loss information, account information, or the like, and typically varies from one scratch-off product to the next, and may thus be referred to as variable indicia or variable information. Thus, although two or more scratch-off products may look virtually identical on the surface, the variable indicia may serve to differentiate between the two products. For example, in the case of a pair of lottery tickets, one ticket may contain monetary winnings and one ticket may contain nothing; the only way to determine which ticket is which is to remove the scratch-off coating.

Due to the differences in scratch-off products caused by the variable indicia, unscrupulous individuals may desire to detect the indicia without removing the scratch-off coating; that is, unscrupulous individuals may seek to read or decode the indicia without altering the scratch-off product itself. The reasons for doing so may include, for example, identifying and keeping winning lottery tickets so that only losing tickets are sold, or using a gift card and subsequently selling it as new. Detection techniques such as candling, induced fluorescence, diffusion, and mechanical lifting of the scratch-off coating, to name a few, can be used by such individuals to detect or reveal the hidden indicia and thus compromise the security of the scratch-off product.

To combat or reduce the effectiveness of these detection techniques, printable substrates for use in such products have been designed or proposed. A printable substrate in this regard refers to the generally flat or planar product that becomes part of the scratch-off product and upon whose outer surface the variable indicia for the scratch-off product is printed before being covered over. Printable substrates may be or include paper, plastic, film, foil, or any other medium suitable for printing. One way to design a printable substrate that is less susceptible to the detection techniques is to increase the opacity of the substrate. In this regard, opacity refers to the capacity of a material to absorb, scatter, reflect, and/or otherwise block visible light from being transmitted. For higher values of opacity, less visible light is transmitted, while for lower values of opacity, more visible light is transmitted. Increasing the opacity by, for example, dying the substrate a darker color such as black or gray, may make it more difficult to read the hidden or buried indicia by shining light through the substrate. In addition, the thickness of the printable substrate may also be increased to raise the opacity further so as to reduce the likelihood of the information in the scratch-off product being compromised.

Such approaches for printable substrate designs that are more secure have proven helpful in reducing unauthorized detection of the hidden indicia within the scratch-off product, but such designs are not problem free. One issue that may arise is cost. Increasing the thickness of a readable substrate, for example, may result in additional costs being incurred, both with regards to the substrate itself and the printing costs. Moreover, adding more security features, such as additional inks or dying the substrate, involves more and/or additional materials, which again increases the cost.

Another issue is a lack of industry-wide standards regarding features such as opacity. For instance, a substrate may be advertised as having "total opacity"; however, "total opacity" does not define a particular level, or range, or opacity. In addition, reaching high levels of opacity approaching 100% involves significant trial and error—and thus, materials—which contributes to increased cost as well.

Finally, increasing security measures for scratch-off products does not solve the problem of alteration; rather, it simply forces people to come up with other ways around the security features and thus compromise the scratch-off products. While certain techniques, such as candling, may not work as well with a dyed substrate scratch-off product, other techniques, such as the use of chemicals, may still reveal the hidden indicia without showing that the scratch-off product was compromised.

A secure printable substrate consistent with the present disclosure, by contrast, may utilize an opacity layer that consists of, or includes, copper. The opacity layer may be disposed within the printable substrate above a base layer. A background layer may be disposed above the opacity layer, such that the opacity layer is sandwiched between the base layer and the background layer. Finally, an inkjet receptive layer may be disposed on one or both sides of the secure printable substrate. A first inkjet receptive layer may, for example, be disposed above the background layer, and a second inkjet receptive layer may be disposed below the base layer.

Figure 1:
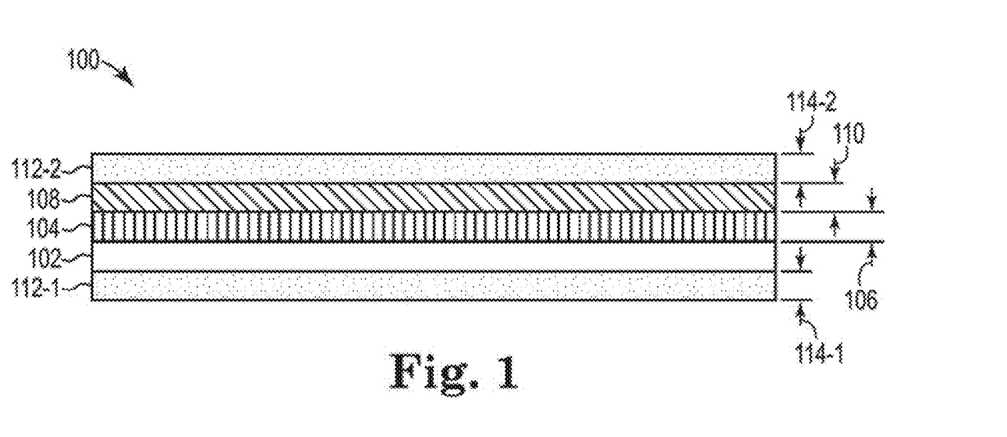
FIG. 1 is a diagram of a secure printable substrate consistent with the present disclosure.

FIG. 1 is a diagram of a secure printable substrate 100, or secure substrate, consistent with the present disclosure. A base layer 102 may be included within the secure substrate 100. The base layer may be or include a foundational layer or starting layer or component to or upon which other layers that make up the finished secure printable substrate can be applied, formed, or otherwise built. The base layer 102 may be or include paper, board, or another type of base stock, although other materials may also be used. The base layer 102 may have any suitable thickness depending on the type of scratch-off product to be manufactured, but is typically in a range from 5 mils to 15 mils (125 to 380 micrometers). In many embodiments, the base layer 102 is responsible for the majority of the mass, and the majority of the thickness, of the secure substrate 100.

An opacity layer 104 is also preferably included as part of the secure substrate 100. The opacity layer 104 may be disposed above the tag base layer 102 as seen from the perspective of FIG. 1, but in other embodiments the opacity layer 104 may be disposed at other locations with respect to the base layer 102. The opacity layer 104 may have any suitable thickness 106, but may typically be in a range from 2 to 8 micrometers.

The opacity layer 104 preferably includes at least a coating or film that contains metallic copper, referred to herein as a copper coating. In some cases, the copper coating may be homogeneous to the extent it contains substantially only metallic copper with no significant amounts of additional elements, e.g. other than standard levels of impurities. In other cases, the copper coating may be heterogeneous. A heterogeneous copper coating or layer may include metallic copper flakes, or other metallic copper particles, in combination with one or more binding agents, and optionally with other components or additives. The heterogeneous copper coating may be applied to the base layer or to another preexisting layer in liquid form from a solution, and then dried. The solution, referred to herein as a copper flake solution, may be or include a mixture of metallic copper flakes or other copper particles, and a binding agent. The binding agent may be, for example, polyvinyl alcohol (PVA), although other binding agents that do not react with copper may also be used. The copper flake solution may in some cases have a copper concentration in a range from 20% to 70%; that is, an amount from 20% to 70% by dry weight of the copper flake solution may be metallic copper, with the remaining 80% to 30% respectively (dry weight) being PVA and/or additional binding agents. The copper flake solution may further include additional additives, such as dispersants, defoamers, and/or surfactants, depending on the application for which the final product is to be used. In the finished product (printable substrate), the coat weight of the opacity layer 104 may be in a range from 4 to 12 grams per square meter (gsm), or from 6 to 10 gsm, and its thickness may be as described in the preceding paragraph. The amount of metallic copper in this layer may thus be in a range from 20 to 70 wt %, with the remaining 80 to 30 wt % being PVA and/or other binding agents and/or additives. An increased weight percent of metallic copper generally corresponds to an increased opacity of the layer 104.

The use of PVA may assist in binding the copper to the base layer 102. In addition, PVA may improve the scratch-resistance of the secure substrate 100. That is, use of PVA as a binding agent may aid in preventing inadvertent or purposeful removal of the opacity layer 104 when the scratch-off product incorporates the secure substrate 100. Regardless of whether a homogeneous copper coating or a heterogeneous copper coating is used in the opacity layer 104, the copper in the opacity layer 104 serves to increase opacity and substantially block visible light from being transmitted through the secure substrate 100. As described previously, shining light through a scratch-off product printed on a substrate is one way to surreptitiously detect and view the hidden indicia contained therein; thus, preventing or blocking visible light from passing through the substrate prevents such unauthorized viewing of the hidden indicia.

In some cases, the opacity layer 104 may contain no other opacity-providing substances, such as carbon black or process black, besides the copper. Carbon black and process black may in general be used to dye one or more layers of a secure substrate black or dark gray to increase the opacity of the secure printable substrate. In some cases, the opacity layer 104 of secure substrate 100 may include substantially only copper and a binding agent, and may lack carbon black, process black, and other absorptive or scattering substances or agents. In other cases, the opacity layer 104 may include both copper and carbon black or process black as absorptive/scattering agents, in addition to the binding agent(s). In such cases, the metallic copper may serve as a primary source of opacity, while the carbon black or process black serves a secondary role to further increase the opacity, and thus the security, of the secure substrate 100.

In the embodiments where the opacity layer 104 includes substantially only copper, with or without a binding agent, but without any carbon black, process black, or other absorptive or scattering substances or agents, the opacity layer 104 may typically contribute an amount of opacity in a range from OD 2 to OD 4, but greater or lesser values are also possible. "OD" in this regard refers to optical density, which equals the base 10 logarithm of the ratio of the intensity of visible light incident on the layer ($I_0$) to the intensity of visible light transmitted by the layer ($I_t$). That is, $OD=\log_{10}(I_0/I_t)$. Thus, a layer that transmits 10% (blocks 90%) of visible light incident upon it has an OD of 1, and a layer that transmits 1% (blocks 99%) has an OD of 2, and a layer that transmits 0.1% (blocks 99.9%) has an OD of 3, and so forth. We say that opacity layer 104 "contributes" an opacity of, for example, OD2 to OD4, because the other components of the secure substrate 100 may also contribute to the opacity of the secure substrate, the major element of which (after the opacity layer) is typically the base layer 102. Thus in a case where the base layer has an opacity of OD 0.5 and the opacity layer has an opacity of OD 3, the combination has an opacity of 3.5. In most embodiments, the primary source of opacity of the secure substrate 100 is the opacity layer 104, and the secondary source of opacity is the base layer 102, and the remaining layers contribute a still lesser amount to the overall opacity. Thus, where the opacity layer 104 has an opacity by itself in the range from OD2 to OD 4, the opacity of the secure substrate 100 may also be in a range from OD 2 to OD 4, or above.

Adding carbon black, process black, or the like to the opacity layer 104 can increase its opacity relative to having no such carbon black, etc., but typically even where carbon black or the like is included, the metallic copper (flakes) are the primary source of the opacity of the layer 104, and the other opacifying agents are secondary, although these roles can be reversed if desired.

The secure substrate 100 may further include a background layer 108. The background layer provides a lightening or whitening function within a secure substrate, such as secure substrate 100, to improve the printing quality and visibility of the indicia printed on the secure substrate (after the scratch-off material has been removed by an ordinary purchaser of the scratch-off product). The background layer 108 as shown may provide a white or otherwise light layer for printing to allow printed inks to be seen more easily. As shown in FIG. 1, background layer 108 may be disposed above the opacity layer 104, and between the opacity layer 104 and an inkjet receptive layer 112-2. The background layer 108 may have any suitable thickness 110, but may typically be in a range from 5 to 20 micrometers.

The background layer 108 may be or include one or more white coatings formed, applied, or laid atop or above the opacity layer 104. Two or more successive layers of white coating may for example be laid or coated atop the outer surface of the opacity layer 104, with the number of layers corresponding to an amount of coating deemed to be sufficient for adequate or better print visibility. In other words, the amount of white coating applied to or applied over the opacity layer 104 as part of the background layer 108 may correspond to an amount of coating needed to cover the opacity layer 104 to provide the desired brightness for printing purposes. As described previously, the opacity layer 104 may lack or omit carbon black, process black, and like opaque materials other than copper. In such cases, the background layer 108 can provide adequate whiteness using less white coating to cover the opacity layer 104, since the background layer 108 does not in those cases cover a black or dark gray layer. The total thickness 110 of the background layer 108 may correlate to the number of individual layers of white coating used to form the background layer 108. Although a white coating background layer 108 is described here with respect to FIG. 1, other bases may be used for the background layer 108, as discussed further below. The background layer 108 may include known agents such as titanium dioxide or hollow sphere pigments (HSP), or both, to aid in whitening, although other whitening pigments, chemicals, and/or agents may be used, including in particular drupelet particles as described below.

The secure substrate 100 may additionally include one or more inkjet receptive layers 112. An inkjet receptive layer may in this regard refer to a layer designed to be printed on; that is, designed to receive and serve as an anchor for printing ink such as inkjet ink. The inkjet receptive layer may in some cases be designed to receive a particular type of ink, such as aqueous dye-based or pigmented inks, and/or may be designed to receive inks by a particular type of printing, such as a printing press. As shown in FIG. 1, the secure substrate 100 may include a plurality of inkjet receptive layers 112. A first inkjet receptive layer 112-1 may be disposed on one side of the substrate 110, above the background layer 108, while a second inkjet receptive layer 112-2 may be disposed on the opposite side of the substrate 110, below the base layer 102. The layers 112-1, 112-2 may be collectively or individually referred to as inkjet receptive layer(s) 112. The inkjet receptive layers 112 may therefore sandwich the base layer 102, opacity layer 104, and background layer 108 as shown. The inkjet receptive layers 112-1, 112-2 may have respective thicknesses 114-1, 114-2 in the finished product. One or each of these thicknesses may be selected as desired to provide an adequate anchor for the ink to be applied to form indicia, but each thickness may typically be in a range from 2 to 8 micrometers.

In some embodiments, the background layer 108 and the second inkjet receptive layer 112-2 may be combined into one layer which provides the necessary functionality of both layers 108 and 112-2. This is discussed further below in connection with FIGS. 4 and 5.

Figure 2:
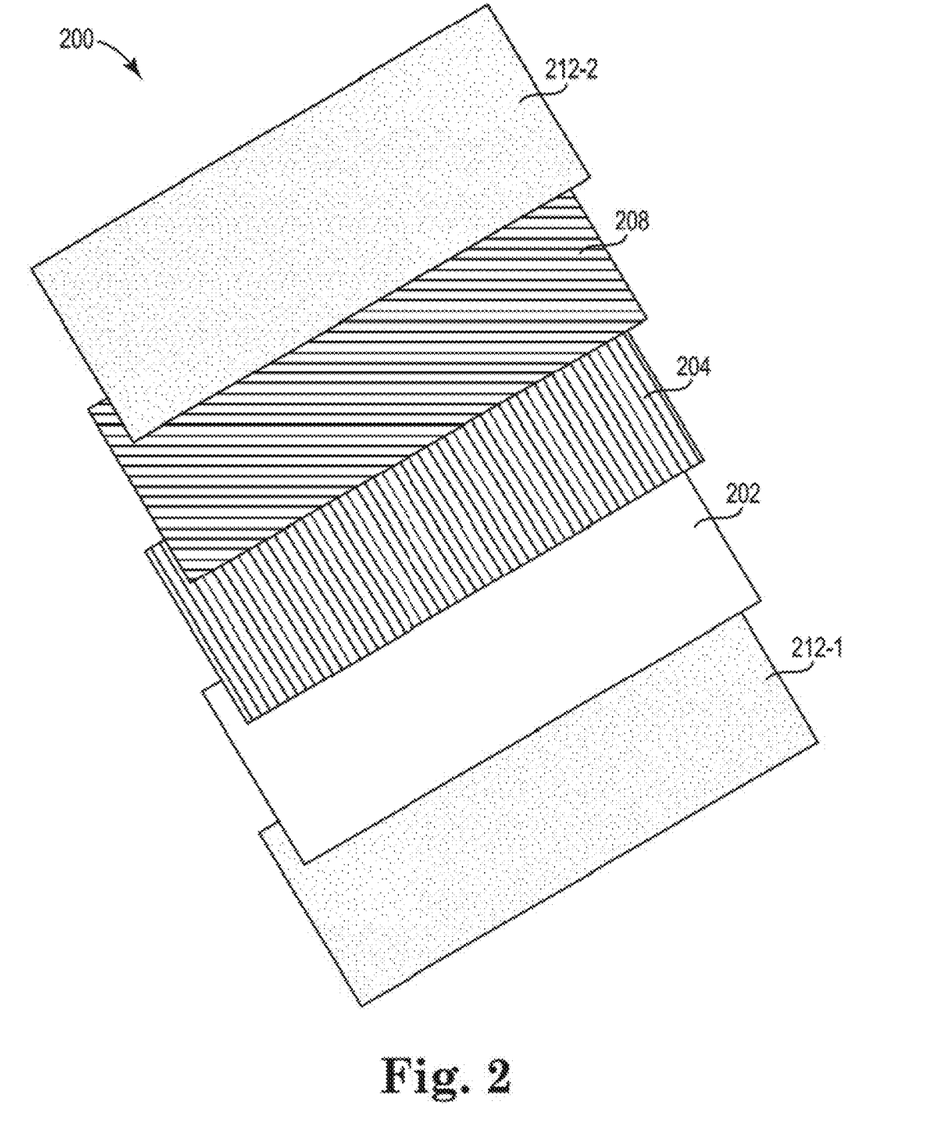
FIG. 2 is an exploded diagram of a secure printable substrate consistent with the present disclosure.

FIG. 2 is an exploded diagram of a secure substrate 200 consistent with the present disclosure. The secure substrate 200, which be the same as or similar to the secure substrate 100 discussed above, may include a base layer 202. The base layer 202 may be the same as or similar to the base layer 102, discussed above. The base layer 202 may be a tag or a board base, or may be or include a foil, plastic film, paper, or any other suitable base material. Disposed below base layer 202 may be a first inkjet receptive layer 212-1, which may be the same as or similar to the inkjet receptive layer 112-1 discussed above. The first inkjet receptive layer 212-1 may be bonded to the base layer 202 such that the bottom of the substrate 200 may be printed on.

An opacity layer 204, which may be the same as or similar to the opacity layer 104 discussed above, may be disposed adjacent to and above the base layer 202. The opacity layer 204 may be or include a copper layer or coating having a particular concentration or amount (e.g. weight percent) of metallic copper. The copper layer may be homogeneous to the extent it contains substantially only metallic copper with no significant amounts of additional elements. In such cases, the concentration or amount of copper in the copper layer or opacity layer 204 may be substantially 100%. The opacity layer 204 may be bonded, applied to, or otherwise attached directly to the base layer 202. In other examples, the copper layer of the opacity layer 204 may be heterogeneous as discussed above in connection with base layer 102. The copper solution used to form such copper layer may comprise flakes or other pieces or particles of metallic copper, and a PVA or other binder. Such copper solution may have a copper concentration in a range from 20% to 70% by weight, but concentrations higher or lower than this range can also be used in some cases. The opacity layer 204 may lack carbon black, process black, or similar opacity-increasing substances or agents; that is, the opacity layer 204 may contain substantially only metallic copper, with or without a PVA or other binder. In other cases, the opacity layer 204 may include a combination of copper and carbon black. In such cases, the carbon black may be included to further increase the opacity of the opacity layer 204. The opacity layer 204 may have a suitably chosen thickness, typically in a range from 2 to 8 micrometers.

The secure substrate 200 may further include a background layer 208, which may be the same as or similar to background layer 108 discussed above. Background layer 208 may be disposed adjacent to and above the opacity layer 204, and may serve to provide a layer upon which an inkjet receptive layer can be applied. In some cases, the background layer 208 may be formed with a coating solution that includes a process water solution and an opaque solution. Process water in this regard may refer to ordinary municipal water, i.e., water that has not undergone additional treatment. The opaque solution may be a lightening or whitening solution, such that application of the solution as part of the background layer 208 lightens the secure substrate 200. The background layer 208 in this regard preferably serves as a whitening layer. The whitening layer may include known agents such as titanium dioxide or hollow sphere pigments (HSP), or both, to aid in whitening, although other whitening pigments, chemicals, and/or agents may be used, including in particular drupelet particles as described below. In addition, the background layer 208 may include a PVA binder and/or other binding agents. As described with respect to FIG. 1, inclusion of a PVA binder may improve the scratch-resistance of the secure substrate 200. Thus, including a PVA binder in both the opacity layer 204 and the background layer 208 may make these layers more resistant to scratching or removal.

Finally, secure substrate 200 may include a second inkjet receptive layer 212-2. The second inkjet receptive layer 212-2 may be disposed as shown above the background layer 208. Thus, the first inkjet receptive layer 212-1 and the second inkjet receptive layer 212-2 may enclose or sandwich the base layer 202, the opacity layer 204, and the background layer 208. As previously described, the second inkjet receptive layer 212-2 may serve as a medium upon which the variable indicia corresponding to the scratch-off product may be printed.

In some examples, the base layer 102 and/or the base layer 202 may be a dyed base sheet. The base sheet may be dyed using a mixture of dyes, such as aqueous dyes, to color the fibers making up the base sheet, and may have an increased level of opacity as compared to other base sheets. This increased opacity of the base layer may permit the opacity layer, such as opacity layer 104 or 204, when applied to the dyed base sheet, to be a homogeneous copper layer or a heterogeneous copper layer without carbon black or the like, rather than a copper/carbon black mixture layer. Additionally, use of the dyed base sheet may reduce the amount of whitening, such as in background layer 108 or 208, needed to lighten the sheet sufficiently to allow the purchaser to easily read the printing thereupon, due to the lack of carbon black in the opacity layer.

Figure 3:
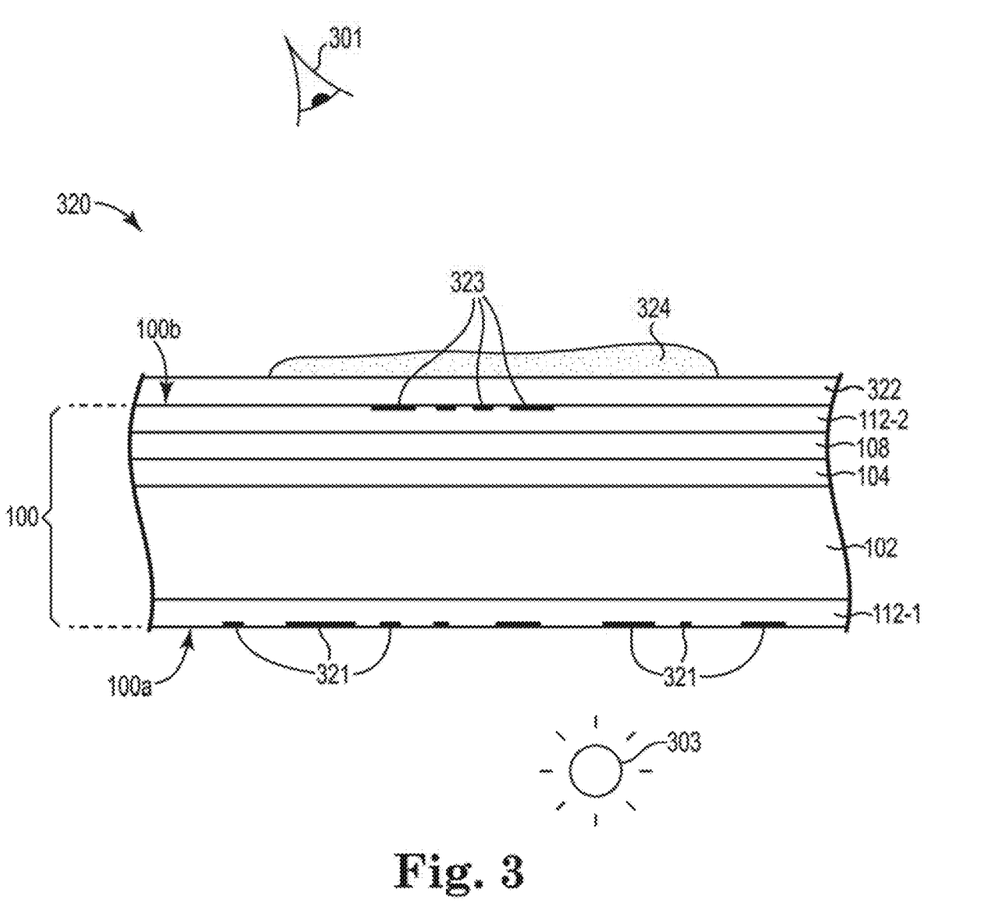
FIG. 3 is a schematic side or cross-sectional view of a scratch-off product that incorporates the secure substrate of FIG. 1.

FIG. 3 shows a schematic view of a simple scratch-off product 320 that incorporates the secure substrate 100 of FIG. 1. Elements and features having the same reference numbers as in FIG. 1 will not be described again to avoid unnecessary repetition. Although relative dimensions in the figure are not to scale, the base layer 102 is nevertheless shown to be thicker than the other layers of the substrate 100 to reflect the fact that the base layer usually provides the majority of the mass and the majority of the thickness of the substrate 100.

The secure substrate 100 has opposed major surfaces 100a, 100b, with surface 100a coinciding with the outer major surface of the first inkjet receptive layer 112-1, and surface 100b coinciding with the outer major surface of the second inkjet receptive layer 112-2. As shown, these surfaces have been printed upon using inkjet printing processes or other suitable printing processes to provide indicia 321, 323.

The indicia 321 may occupy some or all of the back side of the scratch-off product 320, and may contain general contest information, instructions, logos, graphics, or the like (but not the secret variable information which determines whether the product 320 is a winning ticket, tag, etc.), which a buyer or seller of the product 320 can readily view and read by simply looking at the back side.

In contrast, the indicia 323 contains the variable information of potential value, which variable information controls whether the product 320 is a winning ticket, tag, etc. The indicia 323 may be printed at a specific predetermined location or locations on the substrate 100, which location(s) are later used to apply patch(es) of scratch-off material 324 in order to cover up and hide the indicia 323. Before such scratch-off material is applied, but after printing of the indicia 323, an otherwise conventional seal and release layer 322 may be applied to the printed surface of the secure substrate. After the seal and release layer 322 is formed, a patch of the scratch-off material 324 can be applied to the layer 322 over the indicia 323. Typically, the secure substrate 100 is supplied in relatively large sheets or rolls, and indicia 323 containing the variable information are printed at regularly spaced intervals or positions on the sheet. The scratch-off material 324 may then be applied in patches at those same intervals or positions, after which the sheet or roll may be converted (e.g. by cutting or slitting) into individual tickets or rolls of tickets, tags, or the like.

The increased opacity provided by the opacity layer 104 makes it more difficult for an observer 301 to detect the indicia 323 using a backlighting technique in which the product 320 is illuminated from behind with a strong light source 303.

Titanium dioxide, HSP, and similar widely known materials or agents are discussed above for use as whitening agents in the background layers (108, 208) of the disclosed secure substrates (100, 200). When such conventional whitening agents are used, the background layer 108, 208 is typically not itself inkjet receptive or inkjet printable, i.e., it typically does not absorb the liquid component of the applied ink sufficiently to anchor the ink to the layer, resulting in problems such as excessive smudging and/or poor color appearance or gamut of the printed inks. For this reason, a separate inkjet receptive layer 112-2, 212-2 is applied to the background layer 108, 208 to provide such ink-printable properties on the outside major surface of the secure substrate.

Figure 4:
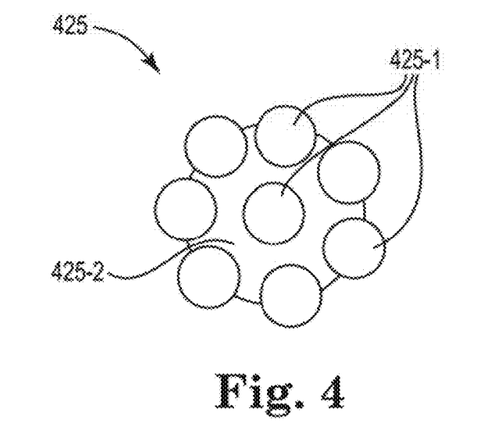
FIG. 4 is a schematic side, top, or bottom view of a particle having a drupelet morphology.

However, we have found that when certain lesser-known whitening agents are used in the background layer, the layer can in fact be made to be inkjet receptive. One such whitening agent is a material composed of microscopic particles each having a complex morphology as an agglomerated particle. Examples of such particles are discussed in U.S. Pat. No. 9,663,650 (Jhaveri), and a whitening agent composed of such particles is available from BASF Corp. under product code Joncryl™ 633. A given particle in these cases may be a solid agglomeration of at least two types of sub-particles. Small sub-particles composed of a first material may for example be embedded or partially embedded in a larger sub-particle composed of a different second material. In the case of Jhaveri, the first material is a hydrophilic polymer having a first glass transition temperature (Tg), and the second material is hydrophobic polymer having a higher, second Tg. The resulting agglomerated particle may have a drupelet-like surface morphology resembling (on a microscopic scale) that of a blackberry or raspberry, not only in shape but in surface definition, with at least part of at least some of the smaller sub-particles protruding from the surface of the larger sub-particle to give the surface a bumpy, raspberry-like, or blackberry-like appearance. A schematic illustration of a particle having a complex morphology, in particular a drupelet morphology, is shown in FIG. 4. There, a solid agglomerated light-scattering particle 425 is composed of sub-particles 425-1 of a first light-transmissive material partially embedded in a larger sub-particle 425-2 of a different second light-transmissive material. The smaller sub-particles protrude from the surface of the larger sub-particle to provide a bumpy, raspberry-like, or blackberry-like appearance.

The complex shape or morphology of the particles 425 produces significant light scattering and a corresponding high whiteness. At the same time, the particles 425, when used in an appropriate concentration in a layer, provide the layer with sufficient porosity so the liquid component of a printed ink can anchor to the surface so as to make the layer inkjet receptive or printable. Still further, the particles 425, at least in their commercial embodiment, are durable in water, which can be advantageous in cases where the scratch-off product is required or specified to survive a washing machine test. The washing machine test is sometimes specified for products (including in some cases scratch-off products) that could be expected to occasionally be left or forgotten in the pocket of a user's shirt or pants in a pile of laundry, in which case it is desirable for the product to survive after being subjected to the wash cycle in a standard residential clothes washing machine. Thus, using particles 425 in a given layer of the secure substrate 100, 200 can not only make the layer whiter and inkjet receptive, but can also help make the secure substrate, and the product of which it is a part, water durable. Use of the particles 425 need not be limited to only one layer, such as background layer 108, 208, but can also be used in other layers of the secure substrate, in particular also in one or both inkjet receptive layers 112-1, 212-1 and 112-2, 212-2.

Thus by suitably tailoring the amount of drupelet particles 425 in the background layer 108, 208, that layer can become inkjet receptive and also provide adequate enhanced whiteness for printing, even if the underlying opacity layer is very dark. Consequently, a separate inkjet receptive layer 112-2, 212-2 on top of the layer 108, 208 is no longer necessary, and can be omitted. We are then also free to revise our terminology, and to refer to the (inkjet receptive and whitening) background layer 108, 208 as an inkjet receptive whitening layer 108, 208, or a whitening layer 108, 208, or an inkjet receptive layer 108, 208. The reference numerals 108, 208 may likewise be replaced with reference numerals 112-2, 212-2 respectively to refer to what was previously described as a background layer or whitening layer but where the composition of that layer is tailored to make it inkjet receptive, and where that layer is the outermost layer on one side of the secure substrate.

Figure 5:
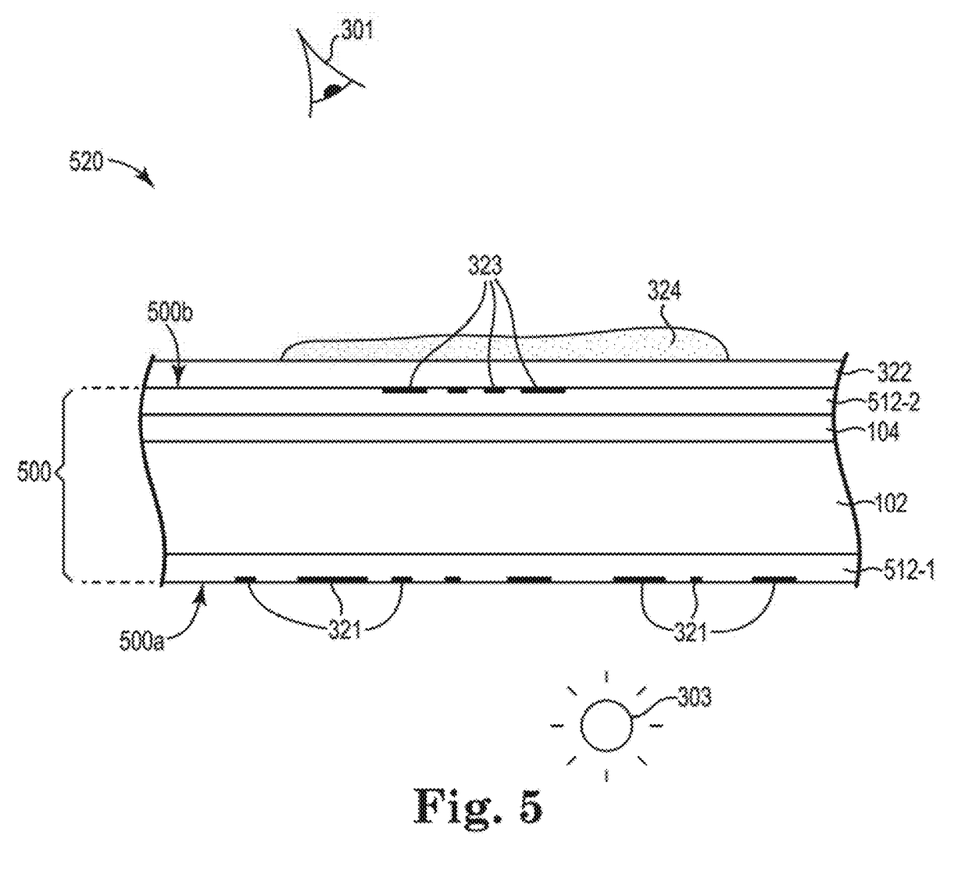
FIG. 5 is a schematic side or cross-sectional view of a scratch-off product that incorporates a secure substrate of simplified design made possible in part by use of drupelet particles such as those of FIG. 4.

A schematic view of a scratch-off product 520 that incorporates a secure substrate 500 of simplified design is shown in FIG. 5. In FIG. 5, elements and features having the same reference numbers as in FIGS. 1, 2, and 3 will not be described again to avoid unnecessary repetition. The secure substrate 500 has opposed major surfaces 500a, 500b, with surface 500a coinciding with the outer major surface of a first inkjet receptive layer 512-1, and surface 500b coinciding with the outer major surface of a second inkjet receptive layer 512-2. As shown, these surfaces have been printed upon using inkjet printing processes or other suitable printing processes to provide the previously-described indicia 321, 323.

The secure substrate 500 may be the same as or similar to the secure substrate 100, except for (a) the absence of a separate background layer between the inkjet receptive layer 512-2 and the opacity layer 104, (b) possible differences in the composition or other features of the first inkjet receptive layer 512-1 relative to the first inkjet receptive layer 112-1, and (c) possible differences in the composition or other features of the second inkjet receptive layer 512-2 relative to the second inkjet receptive layer 112-2. In secure substrate 500, the second inkjet receptive layer 512-2 incorporates a tailored amount of drupelet particles or the like as whitening agents to provide both enhanced whiteness and inkjet receptivity (to avoid the need for a separate background layer), whereas the second inkjet receptive layer 112-2 may in some cases include such drupelet particles while in other cases it may not. The first inkjet receptive layer 512-1 may or may not incorporate such an amount of drupelet particles or the like, or any such drupelet particles, and the first inkjet receptive layer 112-1 may or may not include such drupelet particles.

In the foregoing detailed description of the present disclosure, reference is made to the accompanying drawings that form a part hereof, and in which are shown by way of illustration how examples of the disclosure may be practiced. These examples are described in sufficient detail to enable those of ordinary skill in the art to practice the examples of this disclosure, and it is to be understood that other examples may be utilized and that process and/or structural changes may be made without departing from the scope of the present disclosure.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings herein. Not to limit the application of the doctrine of equivalents to the scope of the claims, each numerical parameter should at least be construed in light of the number of reported significant digits and by applying ordinary rounding techniques.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A secure substrate, comprising:
a base layer;
an opacity layer; and
a first inkjet receptive layer and a second inkjet receptive layer disposed such that the base layer and the opacity layer lie between the first and second inkjet receptive layers;
wherein the opacity layer includes particles of metallic copper dispersed in a matrix of binding agent.

2. The secure substrate of claim 1, wherein the particles of metallic copper include copper flakes.

3. The secure substrate of claim 2, wherein the opacity layer further includes carbon black, process black, or both carbon black and process black.

4. The secure substrate of claim 1, wherein the opacity layer lacks both carbon black and process black.

5. The secure substrate of claim 1,
wherein the opacity layer includes metallic copper in an amount in a range from 20 to 70 weight %.

6. The secure substrate of claim 1, wherein the opacity layer has a thickness in a range from 2 to 8 micrometers.

7. A secure substrate, comprising:
a base layer;
an opacity layer; and
a first inkjet receptive layer and a second inkjet receptive layer disposed such that the base layer and the opacity layer lie between the first and second inkjet receptive layers;
wherein the opacity layer is disposed on a same side of the secure substrate as the second inkjet receptive layer, and wherein no separate background layer is provided between the opacity layer and the second inkjet receptive layer; and wherein the second inkjet receptive layer includes particles having a drupelet morphology.

8. A secure substrate, comprising:
a base layer;
an opacity layer including a heterogeneous copper layer that includes metallic copper particles and a binding agent; and
a first inkjet receptive layer and a second inkjet receptive layer disposed such that the base layer and the opacity layer lie between the first and second inkjet receptive layers;
wherein the binding agent comprises polyvinyl alcohol (PVA), and the copper particles comprise copper flakes.

9. A secure substrate, comprising:
a base layer;
an opacity layer including a heterogeneous copper layer that includes metallic copper particles and a binding agent; and
a first inkjet receptive layer and a second inkjet receptive layer disposed such that the base layer and the opacity layer lie between the first and second inkjet receptive layers;
wherein the opacity layer further includes carbon black, process black, or both carbon black and process black.

10. A secure substrate comprising:
a base layer;
an opacity layer including a heterogeneous copper layer that includes metallic copper particles and a binding agent;
a first inkjet receptive layer and a second inkjet receptive layer disposed such that the base layer and the opacity layer lie between the first and second inkjet receptive layers; and
a whitening layer disposed such that the opacity layer lies between the base layer and the whitening layer, wherein the whitening layer includes a polyvinyl alcohol (PVA) binder and one or more whitening agents.

11. A secure substrate, comprising:
a base layer;
an opacity layer including a heterogeneous copper layer that includes metallic copper particles and a binding agent; and
a first inkjet receptive layer and a second inkjet receptive layer disposed such that the base layer and the opacity layer lie between the first and second inkjet receptive layers;
wherein the opacity layer is disposed on a same side of the secure substrate as the second inkjet receptive layer, and wherein no separate background layer is provided between the opacity layer and the second inkjet receptive layer; and
wherein the second inkjet receptive layer includes particles having a drupelet morphology.

* * * * *